(12) United States Patent
Huang et al.

(10) Patent No.: US 8,924,299 B2
(45) Date of Patent: *Dec. 30, 2014

(54) METHOD AND SYSTEM FOR FACILITATING PAYMENT TRANSACTIONS USING ACCESS DEVICES

(75) Inventors: Jean Huang, Orinda, CA (US); Eric Redmond, Half Moon Bay, CA (US); Pete Heisinger, Woodside, CA (US)

(73) Assignee: Visa U.S.A. Inc., San Francisco, CA (US)

(*) Notice: Subject to any disclaimer, the term of this patent is extended or adjusted under 35 U.S.C. 154(b) by 46 days.

This patent is subject to a terminal disclaimer.

(21) Appl. No.: 13/526,953

(22) Filed: Jun. 19, 2012

(65) Prior Publication Data

US 2013/0024378 A1    Jan. 24, 2013

Related U.S. Application Data

(63) Continuation of application No. 13/188,189, filed on Jul. 21, 2011, now Pat. No. 8,229,855, which is a continuation of application No. 11/929,255, filed on Oct. 30, 2007, now Pat. No. 8,010,453, which is a continuation of application No. 11/624,872, filed on Jan. 19, 2007, now Pat. No. 7,571,141, which is a continuation of application No. 10/229,959, filed on Aug. 27, 2002, now Pat. No. 7,280,981.

(51) Int. Cl.
*G06Q 40/00* (2012.01)

(52) U.S. Cl.
USPC .............................. 705/44; 705/40

(58) Field of Classification Search
USPC .................................... 705/10–44
See application file for complete search history.

(56) References Cited

U.S. PATENT DOCUMENTS

| | | |
|---|---|---|
| 5,483,445 A | 1/1996 | Pickering |
| 5,557,516 A | 9/1996 | Hogan |
| 5,557,518 A | 9/1996 | Rosen |
| 5,621,797 A | 4/1997 | Rosen |
| 5,671,280 A | 9/1997 | Rosen |
| 5,684,965 A | 11/1997 | Pickering |
| 5,692,132 A | 11/1997 | Hogan |
| 5,699,528 A | 12/1997 | Hogan |
| 5,704,046 A | 12/1997 | Hogan |
| 5,705,798 A | 1/1998 | Tarbox |

(Continued)

FOREIGN PATENT DOCUMENTS

| | | |
|---|---|---|
| DE | 10039569 | 6/2001 |
| WO | WO 97/02538 | 1/1997 |

(Continued)

OTHER PUBLICATIONS

"Ambalink Launches secure OnLine shopping in the UK", PR NewsWire, London, Jun. 8, 1999.

(Continued)

*Primary Examiner* — Frantzy Poinvil
(74) *Attorney, Agent, or Firm* — Kilpatrick Townsend & Stockton LLP

(57) ABSTRACT

A payment system for facilitating a payment transaction between a payer and a payee is disclosed. The payment system includes an access device, a payee device, and a services hub. The services hub is configured to communicate with the access device and the payee device; and generate a tracer ticket.

17 Claims, 7 Drawing Sheets

(56) References Cited

U.S. PATENT DOCUMENTS

| | | | |
|---|---|---|---|
| 5,732,400 | A | 3/1998 | Mandler et al. |
| 5,770,844 | A | 6/1998 | Henn |
| 5,774,879 | A | 6/1998 | Custy et al. |
| 5,790,677 | A | 8/1998 | Fox et al. |
| 5,815,657 | A | 9/1998 | Williams et al. |
| 5,815,665 | A | 9/1998 | Teper et al. |
| 5,832,460 | A | 11/1998 | Bednar et al. |
| 5,850,446 | A | 12/1998 | Berger et al. |
| 5,853,977 | A | 12/1998 | Dalie et al. |
| 5,878,141 | A | 3/1999 | Daly et al. |
| 5,878,215 | A | 3/1999 | Kling et al. |
| 5,878,337 | A | 3/1999 | Joao et al. |
| 5,889,863 | A | 3/1999 | Weber |
| 5,903,652 | A | 5/1999 | Mital |
| 5,918,216 | A | 6/1999 | Miksovsky et al. |
| 5,918,218 | A | 6/1999 | Harris et al. |
| 5,923,734 | A | 7/1999 | Taskett |
| 5,931,917 | A | 8/1999 | Nguyen et al. |
| 5,933,812 | A | 8/1999 | Meyer et al. |
| 5,940,813 | A | 8/1999 | Hutchings |
| 5,963,924 | A | 10/1999 | Williams et al. |
| 5,974,146 | A | 10/1999 | Randle et al. |
| 5,978,840 | A | 11/1999 | Nguyen et al. |
| 5,983,208 | A | 11/1999 | Haller et al. |
| 5,987,132 | A | 11/1999 | Rowney |
| 5,987,140 | A | 11/1999 | Rowney et al. |
| 6,002,767 | A | 12/1999 | Kramer |
| 6,006,199 | A | 12/1999 | Berlin et al. |
| 6,011,858 | A | 1/2000 | Stock et al. |
| 6,016,484 | A | 1/2000 | Williams et al. |
| 6,029,152 | A | 2/2000 | Bublitz et al. |
| 6,038,548 | A | 3/2000 | Kamil |
| 6,058,373 | A | 5/2000 | Blinn et al. |
| 6,061,665 | A | 5/2000 | Bahreman |
| 6,067,532 | A | 5/2000 | Gebb |
| 6,070,150 | A | 5/2000 | Remington et al. |
| 6,072,870 | A | 6/2000 | Nguyen et al. |
| 6,081,790 | A | 6/2000 | Rosen |
| 6,098,053 | A | 8/2000 | Slater |
| 6,101,477 | A | 8/2000 | Hohle et al. |
| 6,102,287 | A | 8/2000 | Matyas, Jr. |
| 6,115,458 | A | 9/2000 | Taskett |
| 6,115,712 | A | 9/2000 | Islam et al. |
| 6,119,105 | A | 9/2000 | Williams |
| 6,125,352 | A | 9/2000 | Franklin et al. |
| 6,141,651 | A | 10/2000 | Riley et al. |
| 6,148,301 | A | 11/2000 | Rosenthal |
| 6,182,891 | B1 | 2/2001 | Furuhashi et al. |
| 6,189,789 | B1 | 2/2001 | Levine et al. |
| 6,205,436 | B1 | 3/2001 | Rosen |
| 6,219,651 | B1 | 4/2001 | Bublitz et al. |
| 6,230,145 | B1 | 5/2001 | Verderamo et al. |
| 6,254,000 | B1 | 7/2001 | Degen et al. |
| 6,332,133 | B1 | 12/2001 | Takayama |
| 6,609,206 | B1 | 8/2003 | Veneklase |
| 6,853,977 | B1 | 2/2005 | Niwa |
| 6,868,391 | B1 | 3/2005 | Hultgren |
| 6,876,971 | B1 | 4/2005 | Burke |
| 7,249,069 | B2 | 7/2007 | Alie et al. |
| 7,280,981 | B2 * | 10/2007 | Huang et al. ............... 705/40 |
| 7,343,344 | B2 | 3/2008 | Tomoike |
| 7,558,407 | B2 | 7/2009 | Hoffman et al. |
| 7,835,960 | B2 | 11/2010 | Breck et al. |
| 8,010,453 | B2 * | 8/2011 | Huang et al. ............... 705/40 |
| 8,095,465 | B2 | 1/2012 | Horvath et al. |
| 8,103,584 | B2 | 1/2012 | Bishop et al. |
| 8,116,730 | B2 | 2/2012 | Smith |
| 8,229,855 | B2 * | 7/2012 | Huang et al. ............... 705/44 |

FOREIGN PATENT DOCUMENTS

| | | |
|---|---|---|
| WO | WO 01/86539 | 11/2001 |
| WO | WO 01/95546 | 12/2001 |
| WO | WO 02/13154 | 2/2002 |
| WO | WO 02/21354 | 3/2002 |

OTHER PUBLICATIONS

Decision from EP Application No. 06 000 580.8, dated Sep. 17, 2010 (24 pages).

* cited by examiner

METHOD AND SYSTEM FOR FACILITATING PAYMENT TRANSACTIONS USING ACCESS DEVICES

CROSS-REFERENCE TO RELATED APPLICATIONS

This application is a continuation patent application of U.S. patent application Ser. No. 13/188,189, filed Jul. 21, 2011, which is a continuation of U.S. patent application Ser. No. 11/929,255, filed Oct. 30, 2007, which is a continuation of U.S. patent application Ser. No. 11/624,872, filed Jan. 19, 2007, which is a continuation of Ser. No. 10/229,959, filed Aug. 27, 2002, which are herein incorporated by reference in their entirety for all purposes.

BACKGROUND OF THE INVENTION

The present invention relates generally to the field of financial transaction processing and, more specifically, to a method and system for facilitating payment transactions using portable electronic devices.

A typical consumer generally maintains a number of financial accounts. For example, a consumer may have a number of credit and/or charge accounts issued by various financial institutions or merchants as well as the more traditional banking accounts, such as, savings and checking accounts. When making payments, most consumers usually choose either a charge account or a checking account. In the case of a credit purchase, a charge is made against a credit account, and in the case of a debit purchase, a transaction amount is debited against a checking account.

Various financial accounts are typically offered and maintained by different financial or business institutions. In most cases these accounts are supported by different payment systems and underlying financial networks. For example, a credit account may be issued via a bank or a retail merchant and the payments are processed via credit card payment networks; a debit account may be maintained by an institutional bank; and the transactions are handled by debit card networks.

The physical presentation instruments of a financial account can be a magnetic stripe card, a chip card or a check book. Financial transactions are typically conducted using these presentation instruments and compatible point-of-sale devices at designated card acceptance locations. The cardholder can also provide account information over the Internet in an on-line payment environment.

With a plethora of financial offerings, it is typical for today's consumer to have a number of credit cards, various merchant charge cards, debit cards (DDA-demand deposit accounts), etc. Since different institutions respectively maintain different financial accounts and disparate systems, these institutions generally do not communicate with one another, and there is a lack of uniformity in accessing customer accounts. If access to all accounts is desired when making payments, a consumer must carry all corresponding presentation instruments and understand the locations and terms by which these instruments are accepted. This may prove to be an inconvenience if a large number of presentation instruments are involved.

In addition, physically carrying presentation instruments also poses a significant security risk. For example, the presentation instrument could get stolen or misplaced, or account information which is typically printed on the presentation instrument may be accessed relatively easily by unauthorized third parties to conduct illegitimate transactions. While it is true that most presentation instruments have a single security level, such as, a signature, a password or logon identification or the like, for authenticating user access to the associated accounts, this single security level does not always provide sufficiently high security assurance that may be deemed desirable for financial transactions. In many commercial transactions, only a single signature, which may be forged with relative ease, is required to consummate a transaction. And in some cases, such as, online transactions conducted on the Internet, no signature is even needed.

Hence, it would be desirable to have a method and system that is capable of providing a uniform secure access via consumer chosen electronic devices to various financial accounts without requiring a consumer to carry the corresponding presentation instruments. It is also desirable to control all such accounts for various financial institutions in tandem from a single interface.

Furthermore, technological advancements have contributed to the increasingly popular use of wireless communication devices. Examples of such wireless communication devices are cell phones, portable digital assistants (PDAs) and the like. One reason for this increasing popularity is the improved portability of smaller wireless communication devices and ubiquitous network access.

Another reason for the increasing popularity is the enhanced functionality of these wireless communication devices. Many wireless communication devices are now able to perform a number of different tasks. More functionality and applications are being developed and added to accommodate the needs of consumers. For example, some cell phones not only provide traditional telephonic functions but they also offer more advanced functions, such as, the capability to allow a user to access and navigate the Internet or otherwise conduct transactions.

Therefore, it would also be desirable to have a method and system that is capable of using the enhanced functionality of portable communication devices to allow a consumer to use a uniform method to access multiple financial accounts for everyday financial activities.

SUMMARY OF THE INVENTION

A method and system is disclosed for electronically connecting any payer to any payee to facilitate a financial transaction across or between payment processing systems. Among other advantages, the system provides a single interface for accessing various accounts belonging to payers and payees. This functionality can enable consumers to pay for purchased goods and/or services at merchant locations or pay individuals without having numerous payment cards in their possession by using personal access devices such as a cell phone, a personal digital assistant (PDA), a regular telephone, or a personal computer with Internet access.

As another example, payers can use such access devices to transfer payment amounts from one or more accounts to one or more payee accounts. This single interface point includes a personal access device and its communication network with a payment services hub. Initially, a registration process occurs at a payment services hub. Users, such as, payers and payees, register their accounts and associated information. Examples of such accounts are credit card accounts, merchant charge accounts, demand deposit accounts (DDAs), and the like. Users can also register access devices such as cell phones, land line telephones and PDAs used to communicate with the payment services hub. It should be noted that payee registration is optional in some exemplary embodiments.

After registration, the payment services hub can be used to facilitate the transfer of payment amounts from a payer account to a payee account even if the accounts are supported by different payment systems.

According to one exemplary method, to initiate a payment request, a registered access device belonging to a payer is used to contact the payment services hub. Upon receiving the payment request, the payment services hub first authenticates the payer's identity and the registered access device. If authentication is successful, the payment services hub generates a tracer ticket for linking the payer to the payee. In one embodiment, the tracer ticket is a data record containing various transaction-related information in an encrypted and digitally signed format. Among other attributes, the tracer ticket can include the authorized payment amount and the payer and payee account information for the subject transaction.

Upon receiving the tracer ticket, the payer forwards this information to the payee. In turn, the payee uses the payee's registered access device to contact the payment services hub. Here, the payee requests payment by providing the tracer ticket information to the payment services hub. Payment is authorized if the tracer ticket information provided matches the payment terms of the ticket that was previously generated by the payment services hub. Advantageously, the payment services hub facilitates a two-tier process where tracer ticket generation is separated from the payer authorization process.

According to another aspect, the payer can register multiple accounts from which payments can be made. Thus, upon payer request, the payment services hub is configured to make a payment from one or more payer accounts to a payee account.

According to another aspect, an exemplary method is disclosed for processing a payment amount to be transferred. This method includes the steps of receiving a payment request from a payee device such as a POS (point of sale) device, and providing a tracer ticket to the payee device. This tracer ticket is then displayed to the payer on the payee device. After the tracer ticket is reviewed by the payer, the method includes the steps of establishing communication with the payment services hub through the payer's access device, and submitting the tracer ticket information via the payer access device. Thereafter, the method validates that the tracer ticket provided to the payee device corresponds to the tracer ticket information received from the payer access device. If validation is successful, the payment request is processed.

According to another exemplary embodiment, the present invention of the payment service hub is implemented as a computer software product executable by a computer and network system infrastructure. This computer software product includes programming code for receiving a payment request along with the payer identification information from a payee device, and for providing a tracer ticket to the payee device. The computer software product further includes programming code for establishing communication with a payer access device based on the provided payer identification information, and for accepting the tracer ticket information from the payer access device. Further, programming code of the payment services hub is included for validating that the tracer ticket information submitted by the payer corresponds to the payee's tracer ticket information, and for processing the payment request such that the designated amount is later transferred or credited to a payee account.

Another exemplary method of transferring a payment amount from a first account to a second account is disclosed. The first account may be a payer account while the second account is a payee account. This method includes the steps of registering the first account with the payment services hub, and registering a communication device associated with the first account. Further steps include using the communication device to request access to the payment services hub, and authenticating the access request using a number associated with the communication device. This number may be a cell phone number or telephone number, for example. Next, steps of requesting transfer of the payment amount from the first account to the second account, and generating the tracer ticket are implemented. Note that the tracer ticket contains designations for the payment amount, the first account and the second account.

According to another exemplary aspect, a method of processing a payment amount is disclosed. The method includes the steps of using a first communication device to request a tracer ticket; and receiving the tracer ticket. As an example, the first communication device can be a land-line telephone. Further, the method includes the steps of using a second communication device and the tracer ticket to request the payment amount; and authorizing transfer of the payment amount from a payer to a payee. Note that the second communication device may be a payee's cell phone.

A further understanding of the nature and advantages of the present invention herein may be realized by reference to the remaining portions of the specification and the attached drawings. References to "steps" of the present invention should not be construed as limited to "step plus function" means, and are not intended to refer to a specific order for implementing the invention. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

The present invention in the form of one or more exemplary embodiments will now be described.

Figure 1:
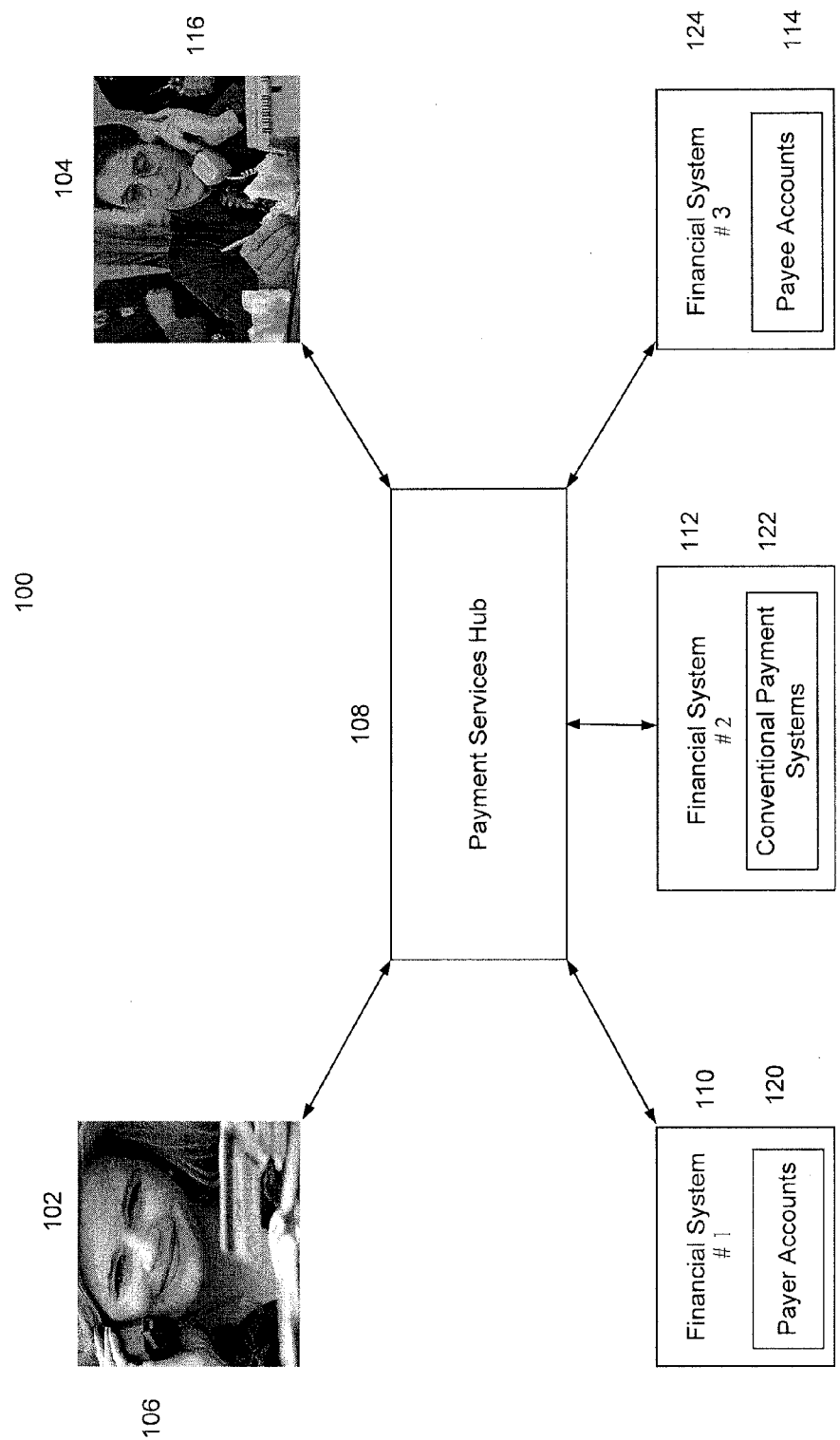
FIG. 1 is a simplified block diagram illustrating the overall architecture of a payment system for facilitating payment transactions in accordance with one exemplary embodiment of the present invention.

FIG. 1 is a simplified block diagram illustrating the overall architecture of a payment system 100 for facilitating payment transactions in accordance with one exemplary embodiment of the present invention. According to the exemplary embodiment, the payment system 100 is provided for facilitating a financial transaction between a payer 102 and a payee 104. The payment system 100 may use mobile communication and Internet based technologies to facilitate such a financial transaction. The payment system 100 includes a payment services hub 108 that manages and coordinates financial transactions among payers, payees, financial institutions and underlying payment processing services.

The payment services hub 108 can communicate with a number of financial systems 110, 112 and 114 maintained by third parties, such as, a bank card issuer, a merchant acquirer, a financial institution, and a business entity, etc. These financial systems offer different types of financial and/or payment services, such as, credit services, debit services, ACH, electronic fund transfers. A payment service hub acts as an integrator that bridges these financial services in support of payers and payees and their associated access devices.

The payment services hub 108 uses selective third party payment services to complete payment transactions between payer account issuers and payee account issuers. For example, referring to FIG. 1, payer account 120 is handled by a first financial system 110, conventional payment services 122 are offered by a second financial system 112, and a payee account 124 is handled by a third financial system 114. Payment services offered by payment services hub 108 will be further described below. Communications between the payment services hub 108 and the financial systems 110, 112 and 114 are conducted via computer networks, such as, the Internet, or dedicated private communication links. In an exemplary embodiment, the payment services hub 108 employs an end-to-end network and system security, and federated access controls. One skilled in the art can easily implement various techniques for secure communication.

In addition, the payment services hub 108 also includes a number of communication interfaces (not shown) to allow communication with access devices. Furthermore, the payment services hub 108 provides a uniform interface to facilitate the authorization and settlement of the payment transactions between disparate payment processing systems. Thus, the payment services hub 108 can allow secure payment transactions to occur between any financial accounts through the access devices chosen by the payer and payee, respectively.

As will be further described below, for example, a payer 102 can use the payment system 100 to pay for goods and/or services purchased from a merchant/payee 104. More specifically, the payer 102 may utilize an access device, such as, a cell phone 106, to contact the payment services hub 108 to effect payment for a purchase to the payee 104. The payee 104 in turn can collect the payment via an access device such as regular telephone 116. The payment services hub 108 utilizes an electronic tracer ticket (not shown) to associate the payer 102 and the payee 104 and ensure that the payment transaction to be completed is authorized. The function and use of the tracer ticket will be further demonstrated below.

The payment services hub 108 communicates with the relevant financial systems that respectively maintain the payer account and the payee account as well as other payment processing systems that may be needed and effect transfer of funds between the accounts. For example, if the payer account is a credit card account, the payment services hub 108 coordinates all the relevant activities amongst the issuer financial system, the acquirer financial system and the processing network to effect the payment authorization and the transfer of funds between the issuer financial system and the acquirer financial system. The payment services hub 108 can support smart cards, personal identification numbers, biometric mechanisms and other techniques for payment authentication and authorization.

Figure 2:
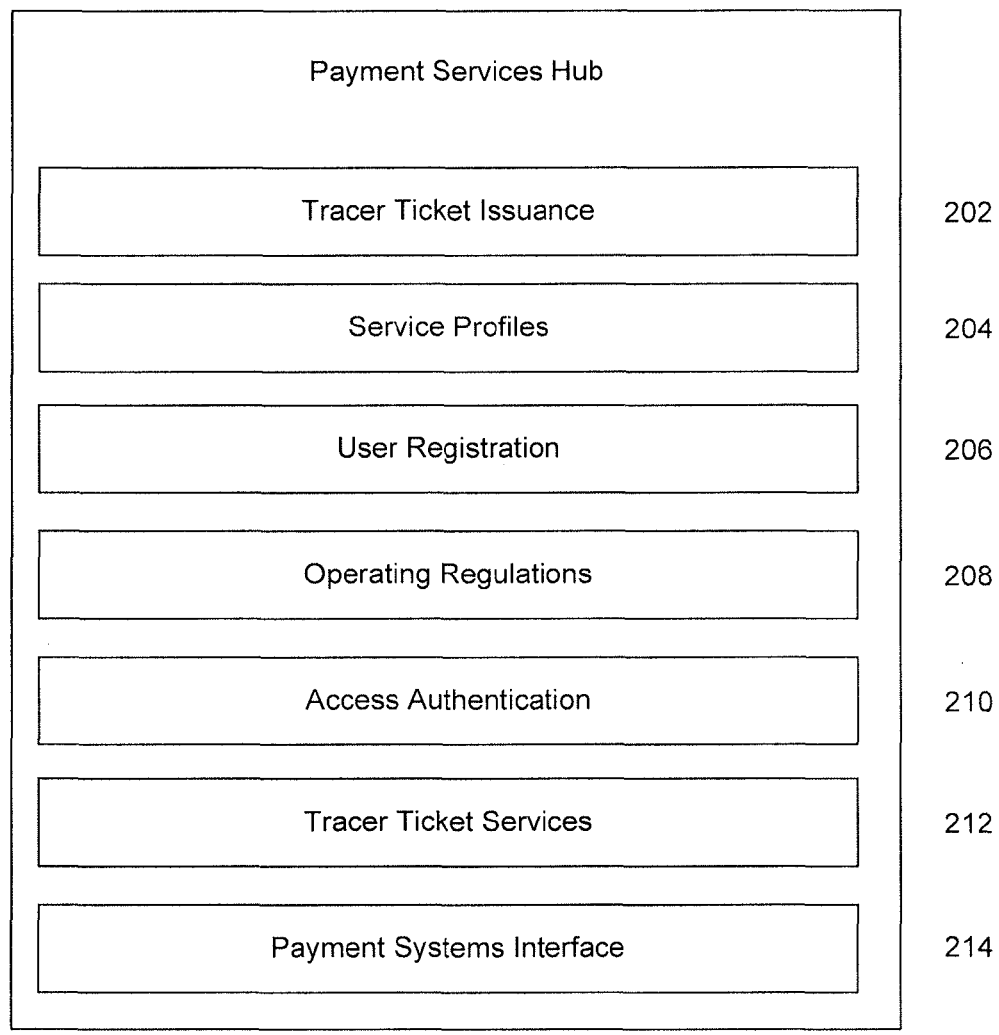
FIG. 2 is a simplified block diagram illustrating an exemplary embodiment of a payment services hub in accordance with the present invention.

FIG. 2 is a simplified block diagram illustrating an exemplary embodiment of the payment services hub 108 in accordance with the present invention. The payment services hub 108 may comprise software components, hardware components, or a combination of both. Hardware components include, for example, switches, routers, groups of modem cards for dial-in users, voice response units, and/or a gateway cards for connections to a local area and external networks. The software components of the payment services hub 108 described here can be implemented in a distributed or integrated manner depending on the system capabilities and agreements of the participating financial institutions. Based on the disclosure provided herein, a person of ordinary skill in the art will know of other ways and/or methods to implement the payment services hub 108 in accordance with the present invention.

Referring to FIG. 2, the payment services hub 108 has a number of modules as shown. These modules can include one or more program codes or applications for performing desired tasks. The modules include a tracer ticket issuance module 202 for generating tracer tickets, a service profiles module 204 for maintaining user service profiles and personal preferences, a user registration module 206 for registering payers and, optionally, for registering payees, an operating regulations module 208 for providing technical and business operating regulations that govern the use of the services, an access authentication module 210 for maintaining and enforcing authentication schemes or profiles relating to access devices, a tracer ticket services module 212 for providing a number of services specific to the tracer tickets, and a payment system interface module 214 for communicating and message formatting transactions for various payment services.

As mentioned above, tracer tickets are generated by the tracer ticket issuance module 202. Such a tracer ticket associates a payer and a payee to authorize the transfer of payment amounts from the payer to the payee. In one exemplary embodiment, a tracer ticket is a secure financial token representing a collection of payment terms containing pertinent payment authorization, and clearing and settlement information required by the downstream payment processing systems. This information includes, for example, an identification number associated with the tracer ticket, a payment amount, payee name, payer name, transaction details, password, digital certificate, digital signature, account information, payment instructions, payee's identity, e-mail addresses and other pertinent transaction information. The tracer ticket may also represent a payment assertion made by payer and/or the payment system 100.

If the payee's name, identity, and/or the account information is not specified at the time of tracer ticket issuance, possession of the tracer ticket constitutes a rightful claim to the payment amount, provided other transaction conditions have been satisfied. Note that rightful possession of the tracer ticket is validated by the payment system 100, which validates the payee's (the ticket bearer) knowledge of the payment terms by verifying knowledge that should only be known to the payee. The use of tracer tickets will be further described below.

The service profiles module 204 receives and maintains various types of information from users. Users include payers and, optionally, payees. This information includes, for example, personal preferences, security preferences, payment profiles and device information relating to access devices that will be used to access the payment services hub 108.

The user registration module 206 registers and maintains payer and/or payee information, such as, information relating to accounts and their associated access devices. More specifically, a user (either a payer or a payee) provides a list of accounts that are to be serviced and/or managed by the payment services hub 108. Each account may be associated with one or more access devices, such as, a cell phone, a PDA, a traditional telephone, a personal computer, a point-of-sale device, etc. Information relating to these access devices is registered or linked to a specific account.

Payment services hub 108 only allows access devices (and no other devices) that are linked to an account (i.e., registered access devices) to be used to conduct a payment transaction in connection with that account. For example, a payer may provide information relating to his/her checking account to the payment services hub 108 and link that account to a particular cell phone. As a result, the payment services hub 108 only allows that particular cell phone to be used for transacting business in connection with that payer's checking account.

The operating regulations module 208 defines and maintains regulations that govern the user' activities. Users, including payers and payees, of the payment system 100 are required to abide by the applicable operating regulations. These regulations include business regulations, such as, service agreements, privacy regulations and dispute resolution, insurance policy and escrow policy, etc. For example, dispute resolution regulations specify a party's recourse when that party fails to receive funds that are supposed to have been transferred by the payment system 100. These regulations also include technical regulations that need to be complied with for communication with the payment services hub 108. For example, a regulation may specify technical and network criteria that must be complied with before a financial institution is allowed to communicate with the payment services hub 108.

The access authentication module 210 stores and maintains respective authentication schemes for registered access devices. Different access devices may utilize different authentication schemes, such as, user ID/password, PKI or digital certificate, smart card, and biometric information including fingerprint, voice print, retina scan and any other unique identification information, etc. This provides additional security against unauthorized use of registered access devices. For example, a stolen access device, albeit registered, cannot be used to effect a payment transaction using the payment services hub 108 if the access device cannot be authenticated.

Tracer ticket services module 212 provides services that are specific to the processing of tracer tickets. These services may include acquisition, authentication, authorization, settlement, audit and dispute resolution relating to the payment transactions initiated by the tracer ticket.

Payment system interface module 214 provides the ability to format, translate, and route the payment transactions to appropriate payment networks, e.g., ATM networks, credit card networks, ACH networks, etc. for completing the payment transactions originated by the payment system 100.

Figure 3:
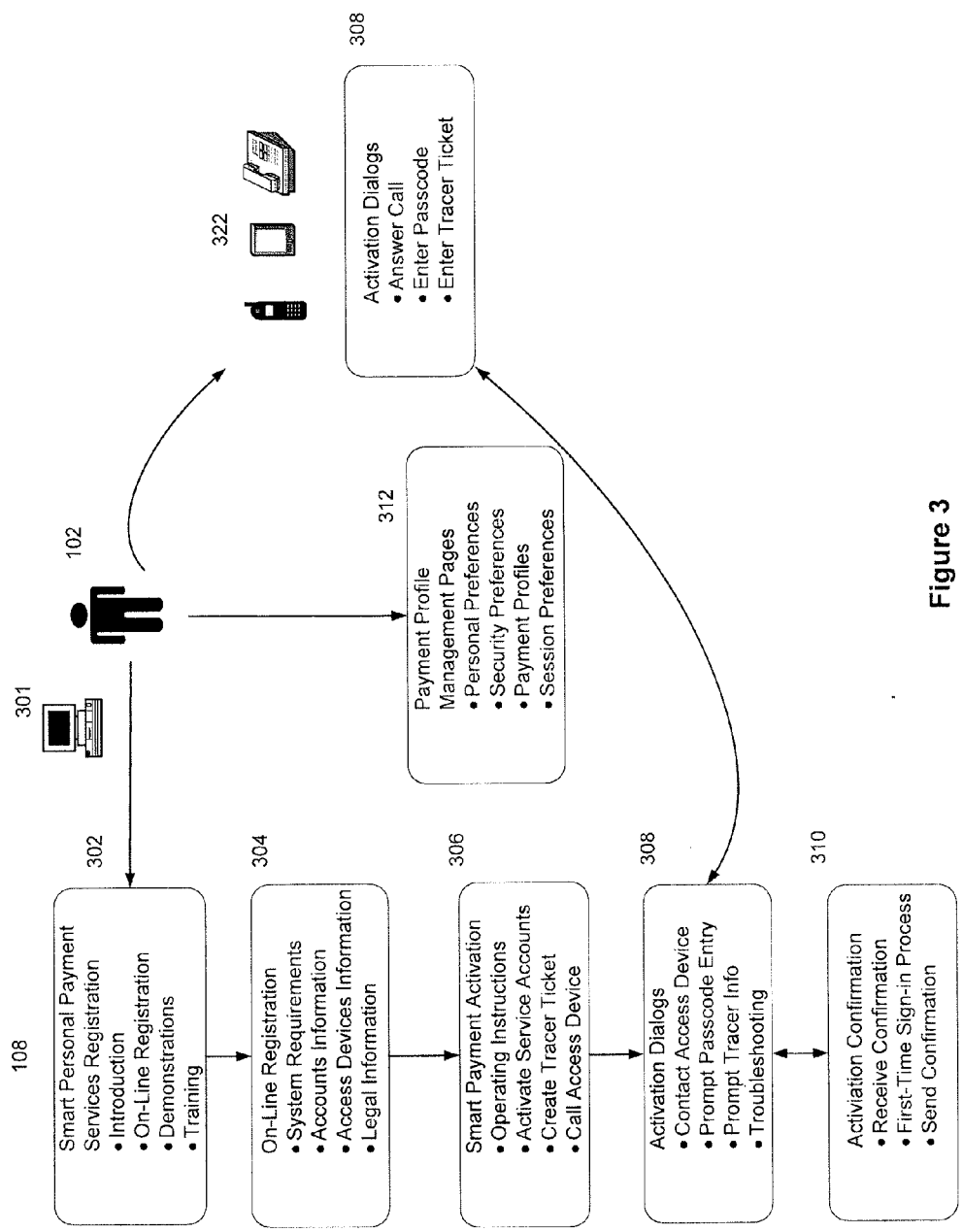
FIG. 3 is a flow diagram illustrating an exemplary method of registering users of the payment system in accordance with the present invention.

FIG. 3 illustrates an exemplary method for registering users, such as payers, with the payment system 100. To use the payment system 100, it is preferred that the payer 102 provides certain registration information. In an exemplary embodiment, the registration information is collected by the payment services hub 108, more specifically, the user registration module 206, via a user interface that is accessible through the Internet.

At step 302, the registration process is initiated by the payer 102 online. The payer 102 uses, for example, a computer 301 to access one of the affiliated registration web sites of the payment system 100. The web site provides an introduction that describes the payment services, provides demonstrations, and thereafter, if the payer 102 wishes to proceed, initiates a registration process. Services related to the registration process may be hosted by the payment system 100, generic service providers designated to set up register and qualify user accounts, or an account issuer website (i.e., a bank or a financial institution). In addition, although not shown, the registration process may occur over the telephone or via regular postal mail services.

At step 304, payer information is provided to the payment services hub 108. The payer 102 fills out a registration form, and provides the requested information to register the accounts that are to be serviced by the payment system 100. For example, the payer 102 may provide a name, address, bank account numbers, credit card numbers, and other pertinent information. Further, access devices 322 that will be used to communicate with the payment services hub 108 are registered by the payer 102. These access devices may be a cell phone, a PDA, a traditional telephone, a computer and the like. More specifically, the payer 102 specifies how the access devices are to be linked to the registered accounts. For example, the payer 102 can link all the access devices to all registered accounts. Alternatively, certain designated accounts may be linked only to certain access devices. For example, the payer's registered credit card account may be linked with a registered cell phone, but not with a registered PDA.

The registration process of the payment services hub 108 also captures information that is needed to authenticate the registered access devices for security reasons. The payment services hub 108 is designed to support a number of authentication schemes used by various access devices. For example, a fingerprint, a voice print over the telephone, logon identification and password may be captured and stored by the payment services hub 108.

Other information relating to personal preferences and payment profiles 312 may also be captured by the payment services hub 108 during the registration process. For example, the payer 102 can specify accounts from which payment for goods and/or services are automatically made if the conditions of the purchase satisfy the established payment profile. In another example, the payer 102 directs that a registered account specifically be charged for purchases from designated merchants. Further, as shown, the payer 102 can provide updated information as needed for profile management at step 312. Such information can be, for example, personal preferences, security preferences, payment profiles and session preferences.

As part of the registration process, certain information, such as, legal information and user operating regulations is provided to the payer 102. Such information includes security agreements, privacy, arbitration, insurance, escrow policies, etc. As an example, a user agreement may state that the payer must pay for goods and/or services as agreed between the payer 102 and a merchant from whom the goods and services were purchased. As another example, the user agreement may require that the payer 102 submit all disagreements for arbitration. If payer 102 agrees with the legal and user operating regulations, the payer 102 is registered with the payment system 100.

At step 306, the payer's account is activated. The payer 102 is guided through a test run, illustrating operations of the payment services provided by the payment system 100. First, a dummy tracer ticket for demonstration purposes is created by the payment services hub 108 for use during the test run. An identification number and a pass code are generated in association with the dummy tracer ticket. The payer 102 is then directed by the payment services hub 108 to activate a registered access device for the test run. The payment services hub 108 then contacts the activated registered access device.

At step 308, communication is established between the payment services hub 108 and the registered access device 322. The payer 102 is asked by the payment services hub 108 to provide the dummy tracer ticket. In response, the payer 102 uses the registered access device 322 to enter the identification number and the pass code associated with the dummy tracer ticket. If the identification number and/or the pass code is incorrect, or, if payment services hub 108 is unable to contact the registered access device 322, a troubleshooting dialog is initiated by the registration web site.

Otherwise, at step 310, registration is confirmed. The payer 102 is prompted to confirm registration of the indicated accounts and access devices 322. In turn, the payer 102 provides the requested confirmation, whereupon a registration-complete acknowledgment is sent by payment services hub 108 to the payer 102.

As mentioned above, it should be noted that a payee 104 may also be registered with the payment services hub 108. A registered user can be either a payer 102 or a payee 104. Registering a payee 104 requires less information. A payee 104 only needs to provide sufficient information to identify the accounts that are to be serviced by the payment services hub 108. Once registration is completed, the payment services hub 108 can be used by the payer 102 to effect a payment transaction to pay the payee 104.

Figure 4:
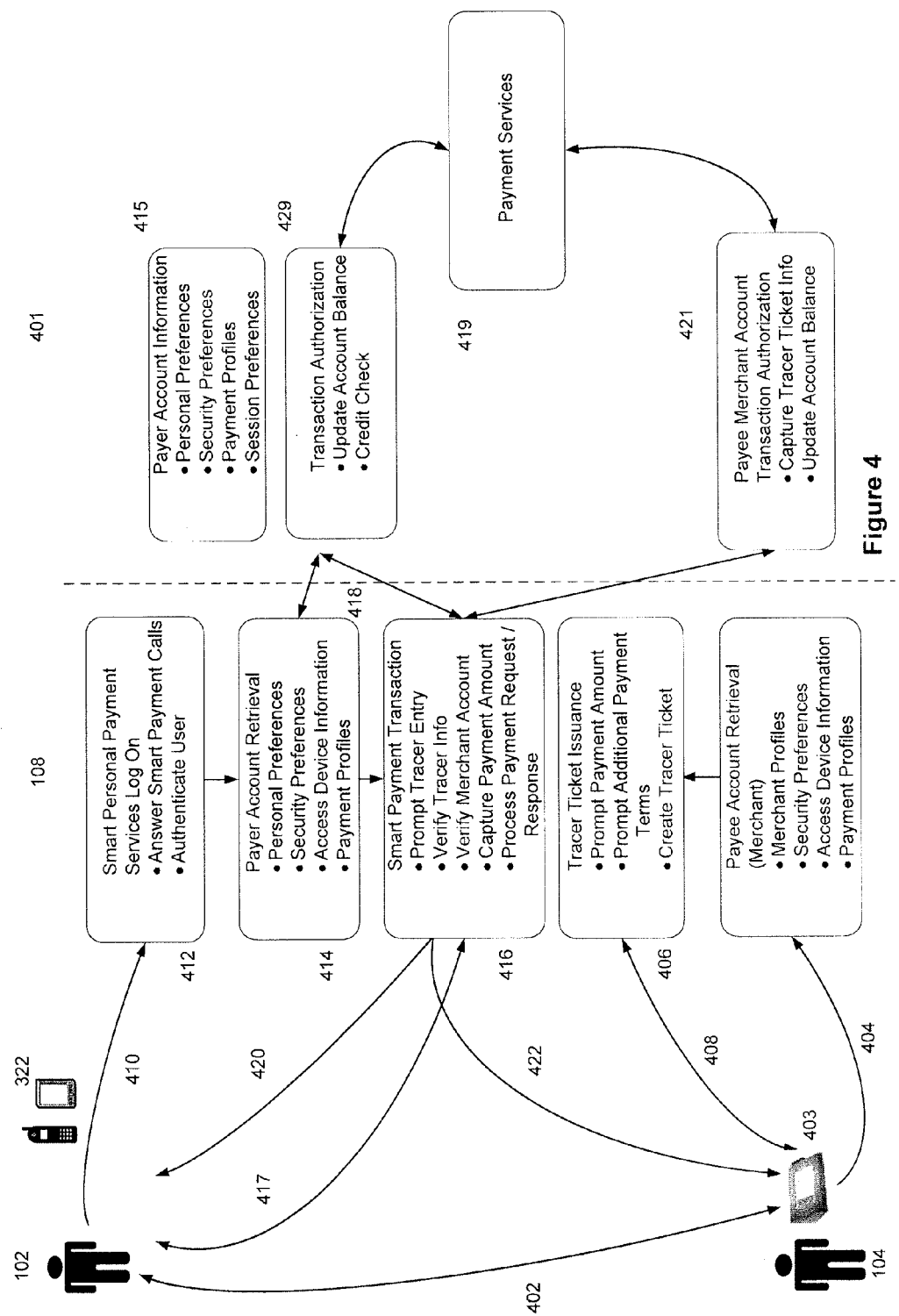
FIG. 4 is a flow diagram illustrating a first exemplary method of using the payment system to pay merchants in accordance with the present invention.

FIG. 4 is a flow diagram illustrating a first exemplary method of using the payment system 100 to pay the payee 104 in accordance with the present invention. More specifically, among multiple payment options at the merchant location, the payer 102 chooses the payment system 100 to pay for goods and/or services purchased from the merchant/payee 104.

At step 402, the payer 102 initiates the payment process by selecting at the POS device 403 an option offering payment services by the payment system 100. In one exemplary embodiment, the POS device 403 is a conventional payment device connected to the payment services hub 108 via the merchant back office systems. In another exemplary embodiment, the POS device 403 can include authentication mechanisms, such as, biometrics (e.g., fingerprint), smart card, user ID/password and the like. These security mechanisms are used to authenticate and authorize the payer's access to the payment services hub 108. For example, after selecting the payment services provided by the payment system 100, a payer 102's fingerprint may be captured by the POS device 403 and forwarded to the payment services hub 108 for validation with a fingerprint verification service to ensure that only an authorized payer can initiate the payment process.

At step 404, the payment services hub 108 is contacted by the POS device 403 to obtain a tracer ticket. As previously noted, the tracer ticket functions to authorize payment of the designated amount. Registered payee/merchant account information and other pertinent information are retrieved from various databases (not shown) for generating the tracer ticket. Examples of such information are payee's (merchant) profile, security preferences profile, access device (POS) profile, and payment profile.

A merchant profile includes a merchant name, types of business and other pertinent information. Security preferences profile includes authentication choices such as payee identification and password, digital certificate, and the like. Access device profile includes authentication and device type information for registered access devices, in this exemplary embodiment, POS device 403. These profiles are evaluated to determine whether the tracer ticket will be generated, and what information is to be included in the tracer ticket. Further, the tracer ticket generation is separate from the payer authorization and tracer ticket validation processes to further enhance overall security. As discussed below at step 406, after the tracer ticket is generated, the tracer ticket number is displayed at the POS device 403. The payer 102 uses the tracer ticket number and a registered access device 322 to authorize payment.

At step 406, to provide the requested tracer ticket, a payment amount is required by the payment services hub 108. Thus, a dialog is initiated between the payment services hub 108 and the POS device 403 to obtain this payment amount. The merchant/payee 104 is prompted for a payment amount and any payment terms, if applicable. The payment amount could be the total purchase price of the goods and/or services, for example. Payment terms may relate to how the payment is to be made, for example. Upon receiving the payment amount data, the tracer ticket is forwarded to the POS device 403 as illustrated at step 408. The PUS device 403, in turn, displays the tracer ticket number for retrieval by payer 102.

At step 410, the payer authorization process is initiated. Specifically, the payer 102 uses the access device 322 to contact the payment services hub 108. This authorization process is separate from the tracer ticket generation process. Thus, while the tracer ticket is generated by using the POS device 403 to contact the payment services hub 108, the authorization process is implemented by using the registered access device 322 to contact the payment services hub 108. This two-tier process further increases overall security within the payment system 100.

At step 412, contact is established. The payment services hub 108 then authenticates access by the payer 102. Specifically, the payment services hub 108 retrieves stored registration information to validate the access device 322. This registration information is used to confirm that access device 322 is indeed linked to the payer 102. The payment services hub 108 employs two or more security levels for authenticating the payer 102. A first security level uses a digital identification associated with the access device 322, and a second security level is a logon id/password. As an example, if the access device 322 is a cell phone, the cell phone number is used for authentication. A second security level can be a user ID/password, smart card, etc. Further yet, fingerprint, voice print authentication may be used for the first, second or third security level, where appropriate. The desired security level and authentication methods can be configured according to the user's preference and operating regulations.

At step 414, the payment services hub 108 retrieves various payer account information. This information comprises personal preferences, security preferences, access device information and payment profiles. Personal preferences include display interface preferences. Security preferences include authentication choices such as password, voice print, biometrics, and the like. Access device information includes cell phone and PDA information, for example. Payment profile information contains information specifying how an account is linked to the registered access device 322. This information is used to authenticate the payer 102, and the access device 322 and to evaluate the criteria of the tracer ticket generations and verification services, and what information is required in the tracer ticket. Optionally, the payment services hub 108 can interact with a conventional payment infrastructure 401 to obtain payer account information 415. Payer account information 415 is an additional profile layer that is set up by the payer 102 within the conventional payment infrastructure 401.

At step 416, a dialog (step 417) is established between the payment services hub 108 and the payer's access device 322. The payer 102 is prompted to enter the tracer ticket number previously obtained at step 408. In response, the payer 102 uses the access device 322 to enter the tracer ticket number, whereupon, the payment services hub 108 begins to verify the tracer ticket information. The payment services hub 108 retrieves the related transaction and merchant information, which is compared and checked against the tracer ticket information.

In one exemplary embodiment, where two or more registered accounts exist, the payer 102 is prompted to select the desired account from which payment will be made. For example, the payer 102 can choose a DDA (checking) account rather than a credit account for a particular transaction. Payment is then initiated through a financial system associated with the DDA account via the payment system interface 214. In another exemplary embodiment, the payer 102 can split the payment amount between two or more registered accounts.

Upon proper authentication, the payment services hub 108, more specifically, the payment system interface module 214 directs the conventional payment infrastructure 401 to process payment authorization according to established payment processing techniques, as illustrated in steps 429, 419 and 421. Once payment is authorized, the conventional payment infrastructure 401 forwards an acknowledgement to the payer and/or payee via the payment services hub 108. As shown at steps 420 and 422, the paid/approved response can be delivered to the POS device 403 and/or the access device 322 to inform the parties regarding the outcome of the financial transaction.

Figure 5:
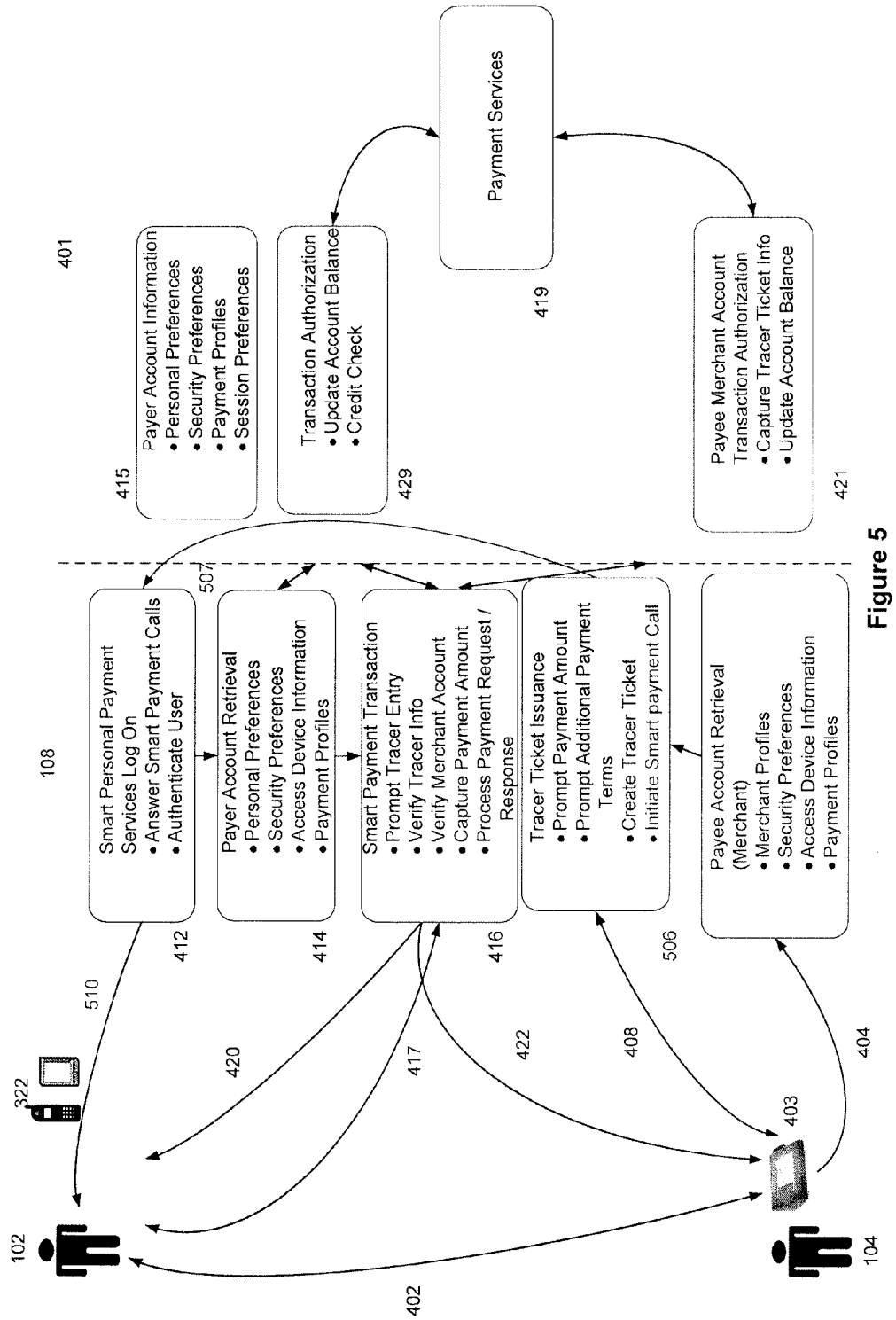
FIG. 5 is a flow diagram illustrating a second exemplary method of using the payment system to pay merchants in accordance with the present invention.

FIG. 5 is a flow diagram illustrating another exemplary method of using the payment services hub 108 to pay merchants in accordance with the present invention.

Specifically, the payer 102 does not originate contact with the payment services hub 108 after the tracer ticket is generated and displayed at the POS device 403. Rather, the payer 102 is contacted by the payment services hub 108 to validate the tracer ticket information. Accordingly, other than steps 506, 507 and 510, all of the steps of FIG. 5 remain the same as those described with reference to FIG. 4.

As noted, at step 404, the POS device 403 contacts the payment services hub 108 to obtain a tracer ticket. This begins step 506 wherein a dialog between the payment services hub 108 and the POS device 403 is initiated. Here, the payee/merchant 104 is directed to enter a payment amount, and any other payment terms, if applicable, along with payer 102's identification information. Upon receiving the payment information, the payment services hub 108 creates and forwards the tracer ticket to the POS device 403, as illustrated at step 408. The POS device 403, in turn, displays the tracer ticket number for retrieval by the payer 102. Thereafter, the payer 102 retrieves the tracer ticket, and awaits contact by the payment services hub 108.

At step 507, the payment services hub 108 initiates contact with the payer 102. Here, the payment services hub 108 retrieves payer 102's personal profiles to contact the access device 322, previously registered by payer 102. Note that one or more access devices may be registered, in which case, the payment services hub 108 contacts the first registered access device, based on a hierarchy established by the payer 102 at registration. If the call is not answered, the next preferred access device is called, etc., until contact is established with the payer 102.

After contact is established, the payer 102 is authenticated by the payment services hub 108 to determine whether the payer 102 is an authorized user with the access device 322. This authentication process was previously described with reference to steps 412-414 of FIG. 4. After authentication, the payer's profile and preferences are retrieved, the tracer ticket information is verified, and the designated payment amount is transferred in the same manner described with reference to steps 412-421 of FIG. 4.

Figure 6:
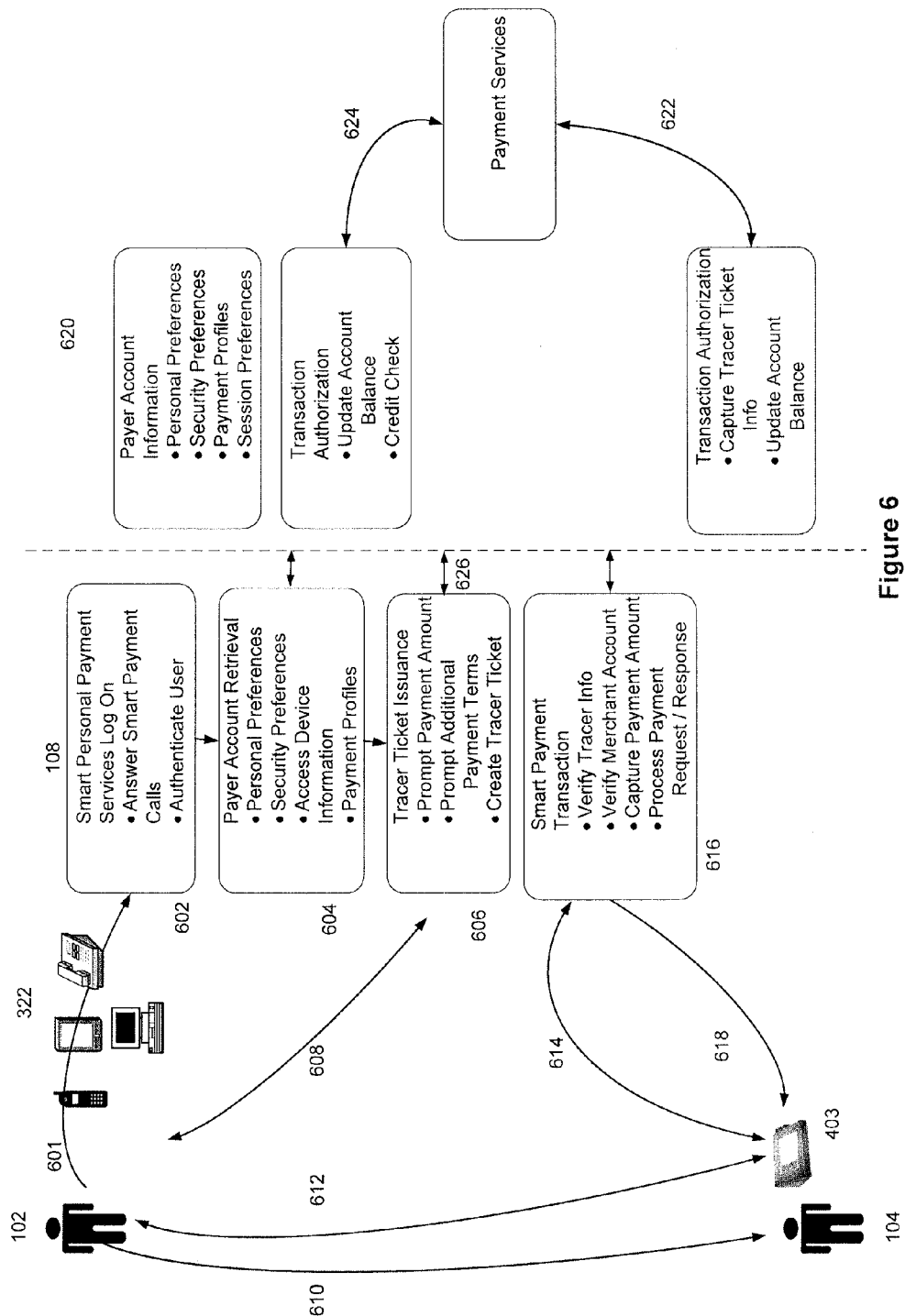
FIG. 6 is a flow diagram illustrating a third exemplary method of using the payment system to pay merchants in accordance with the present invention.

FIG. 6 is a flow diagram illustrating yet another exemplary method of using the payment system 100 to pay merchants in accordance with the present invention. Specifically, the payer 102 can obtain a tracer ticket in advance from the payment services hub 108. This tracer ticket is then presented to a merchant 104 for payment. By obtaining a tracer ticket in advance, the tracer ticket can be used as a pre-authorized payment token.

At step 601, the payer 102 employs the access device 322 to contact the payment services hub 108 for the purpose of obtaining the tracer ticket. At step 602, the payment services hub 108 authenticates the access device 322 (and payer 102). Authentication may be implemented using a number associated with the access device 322. The number may be a telephone number, for example, where the access device 322 is a telephone. If an incorrect telephone number is detected, access to the payment services hub 108 is denied. This authentication process was previously described with reference to steps 412-414 of FIG. 4.

At step 604, the payment services hub 108 retrieves various payer account information, including personal preferences, security preferences, access device information and payment profiles.

At step 606, a transactional dialog (step 608) is initiated between the payment services hub 108 and the access device 322. The payer 102 is prompted for certain information. This information includes a payment amount, payment terms and payee information, for example. After the information is received, a tracer ticket is provided to the payer 102 via the access device 322. Optionally, the tracer ticket is given an expiration time or date; i.e., the tracer ticket has a limited lifetime. The limited lifetime duration provides an additional level of security.

At step 610, the payer 102 wishes to pay for the purchased goods and/or services at a registered merchant/payee 104 location. To initiate payment, the payer 102 uses the POS device 403 to select the payment services offered by the payment system 100.

At step 612, the payer 102 is prompted by the payment services hub 108 to enter the tracer ticket number that was previously provided by the payment services hub 108. In response, the payer 102 enters the tracer ticket number at the POS device 403.

At step 614, the payment services hub 108 (step 616) begins to verify the tracer ticket information. For example, the payment services hub 108 retrieves payment profiles related to the payer 102 and the payee/merchant 104, which are compared and checked against the tracer ticket information. If the tracer ticket has an expiration time, the expiration time is checked to make sure that the tracer ticket is still valid. Thereafter, if the tracer ticket is determined to be valid, the payment amount is captured from the tracer ticket dialog to begin processing the payment request. This payment request is then sent via a payment system interface module 214 to the conventional payment infrastructure 620, which uses conventional techniques to process the request as illustrated in steps 622 and 624. Thereafter, an approved/disapproved response is provided to the payment services hub 108, which conveys the response via the interface 214 to the POS device 403 at step 618.

Figure 7:
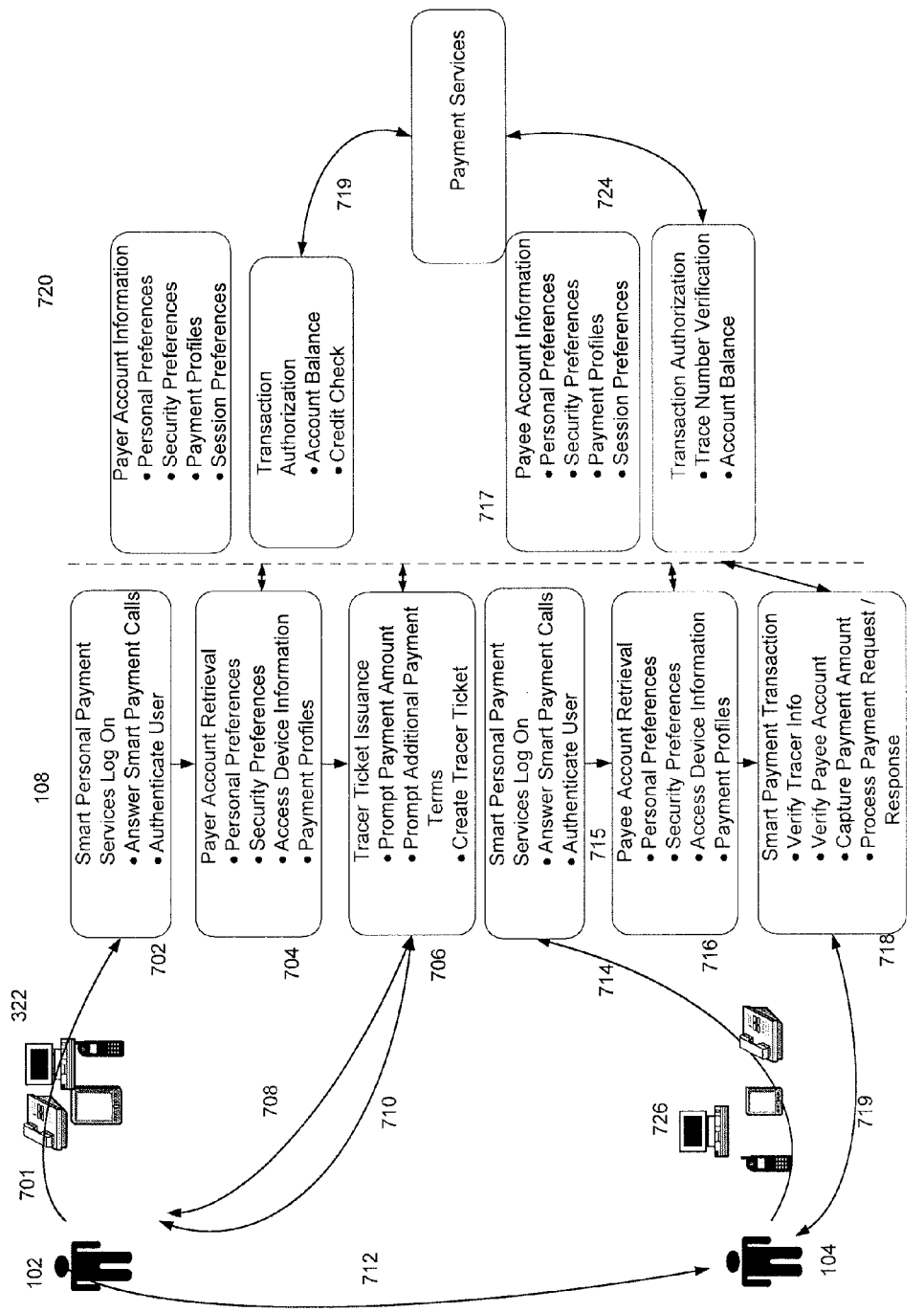
FIG. 7 is a flow diagram illustrating an exemplary method of using the payment system to pay individuals in accordance with the present invention.

FIG. 7 is a flow diagram illustrating an exemplary method of using payment system 100 to pay an individual payee 104. At step 701, this payment process is initiated, wherein the payer 102 employs the access device 322 to contact the payment services hub 108. The purpose of this communication is to obtain a tracer ticket from the payment services hub 108.

At step 702, the payment services hub 108 establishes contact and authenticates access by the access device 322. At step 704, the payment services hub 108 retrieves various payer account information including personal preferences, security preferences, access device information and payment profiles. As previously noted as an example, if the access device 322 is a cell phone, then its cell phone digital identification is used for authentication, along with other authentication techniques such as user ID and password, depending on payer 102's preferences.

At step 706, a transactional dialog (step 708) is initiated between the payment services hub 108 and the access device 322. The payer 102 is prompted for various required information such as a payment amount and payment terms for the transaction. A one-time password for use by the individual payee 104 is further provided. By providing a password, access to the payment services hub 108 by unregistered individual payees can be authenticated. This authentication provides an additional level of security. Upon receiving the required information, a tracer ticket is created and provided to the payer 102 via the access device 322.

At step 710, a transaction confirmation is sent to the payer 102. At step 712, the payer 102 conveys both the password and the tracer ticket number to the individual payee 104 within the appropriate time frame prior to the expiration of the tracer ticket.

At step 714, the individual payee 104 uses the unregistered access device 726 to log on to the payment services hub 108. As shown, the access device 726 may be a computer, a cell phone, a PDA, a regular telephone and the like.

At step 715, the payment services hub 108 receives the logon request and authenticates access by the individual payee 104, an unregistered user of the payment system 100.

At step 716, the payment services hub 108 attempts to retrieve various payee account information, including personal preferences, security preferences, access device information and payment profiles and determines that the logon user is unregistered.

At step 718, a transactional dialog (step 719) is initiated between the payment services hub 108 and the access device 726. The individual payee 104 is prompted for both the tracer ticket number and the associated one-time password that were received from the payer 102. Upon receiving this information, the payment services hub 108 verifies the tracer ticket information, captures the payment amount. The payee 104 is further prompted for the additional account information in order to complete the payment transaction via the conventional payment infrastructure 720. The payment services hub 108 uses the payment system interface module 214 to send a payment request to the conventional payment infrastructure 720. The payment infrastructure 720 then uses conventional techniques to process the payment request as illustrated in steps 719 and 724. Thereafter, the conventional payment infrastructure 720 sends, via the interface 214, an approved/disapproved response to the payment services hub 108.

In turn, at step 719, the payment services hub 108 conveys this response to the individual payee 104 via the access device 726. In this manner, the method of the present invention is used to facilitate electronic transfer of payments between individuals. As an example, the payer 102 can use this method to pay for items purchased from an auction website, such as, eBay. The individual payee 104 indicates a preference to receive a U.S. postal money order for the sold items. The payer 102 then dials into the payment services hub 108, and obtains a tracer ticket incorporating all of the individual payee preferences. The tracer ticket and associated password are then conveyed to the individual payee 104. The individual payee 104 can then use this information to claim the U.S. postal money order at a designated location.

Note, however, that registration is optional for the individual payee 104. Preferably, both the payer 102 and the individual payee 104 are registered with the payment system 100, as previously described with reference to FIG. 3. Once a password and tracer ticket number have been provided, the individual payee can collect the payment amount from any desired location or online where the payment system 100 is accepted for payment processing.

While the above is a complete description of exemplary specific embodiments of the invention, additional embodiments are also possible. Thus, the above description should not be taken as limiting the scope of the invention, which is defined by the appended claims along with their full scope of equivalents.

What is claimed is:

1. A method comprising:
providing, by a computer, to a payment services hub, payer registration information, payer registration information comprising at least one payer account identifier, and a payer access device identifier associated with a payer access device that is used by a payer to pay a payee; and
receiving at the payer access device, from the payment services hub, a tracer ticket based on the payer registration information and payee registration information.

2. The method of claim 1 further comprising:
providing a payment amount to the payment services hub, prior to receiving the tracer ticket.

3. The method of claim 1 wherein the at least one payer account identifier comprises a plurality of account numbers, the plurality of account numbers comprising a payment card number and a checking account number.

4. The method of claim 1 wherein the tracer ticket associates the payee and the payer to authorize a transfer of payment amounts from the payer to the payee.

5. The method of claim 1 wherein the tracer ticket is associated with information including a payment amount, a name of the payee, a name of the payer, and a password.

6. The method of claim 1 wherein the payment services hub comprises a tracer ticket services module.

7. The method of claim 1 wherein the payer access device is phone.

8. The method of claim 7 wherein the payer access device identifier is a phone number.

9. The method of claim 7 wherein the payer registration information specifies how the payer access device is linked to various accounts of the payer.

10. The method of claim 7 wherein the payment services hub comprises a tracer ticket services module, wherein the tracer ticket services module is configured to perform services including authentication, authorization, settlement, and audit and dispute resolution relating to payment transactions involving tracer tickets.

11. The method of claim 1 wherein the payer registration information specifies how the payer access device is linked to various accounts of the payer.

12. The method of claim 1 wherein the payer registration information includes biometric data provided by the payer.

13. The method of claim 1 wherein the payer registration information includes information that specifies accounts from which payment for goods or services are automatically made if the conditions of a purchase satisfy an established payment profile.

14. The method of claim 1 wherein the payment services hub comprises payment profiles of the payer and the payee, and security preferences of the payer and the payee.

15. The method of claim 1 wherein the payment services hub comprises an access authentication module.

16. A system comprising:
   a computer comprising a processor and programmed to provide to a payment services hub, payer registration information, the payer registration information comprising at least one payer account identifier, and a payer access device identifier associated with a payer access device that is used by a payer to pay a payee; and
   a payee access device comprising a processor and programmed to receive from the payment services hub, a tracer ticket based on the payer registration information and payee registration information.

17. The system of claim 16 further comprising the payment services hub.

\* \* \* \* \*